United States Patent
Arai

(10) Patent No.: US 11,787,240 B2
(45) Date of Patent: Oct. 17, 2023

(54) TIRE PRESSURE WARNING DEVICE

(71) Applicant: Nissan Motor Co., Ltd., Yokohama (JP)

(72) Inventor: Takahisa Arai, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 639 days.

(21) Appl. No.: 17/045,792

(22) PCT Filed: May 7, 2018

(86) PCT No.: PCT/JP2018/017583
§ 371 (c)(1),
(2) Date: Oct. 7, 2020

(87) PCT Pub. No.: WO2019/215775
PCT Pub. Date: Nov. 14, 2019

(65) Prior Publication Data
US 2021/0061029 A1   Mar. 4, 2021

(51) Int. Cl.
*B60C 23/04* (2006.01)
(52) U.S. Cl.
CPC ................ *B60C 23/0405* (2013.01)
(58) Field of Classification Search
CPC ..... B60C 23/0405; B60C 23/04; B60C 23/02; B60C 23/0408; G01L 17/00
See application file for complete search history.

(56) References Cited

U.S. PATENT DOCUMENTS

| | | | |
|---|---|---|---|
| 2004/0099055 A1* | 5/2004 | Komatsu | B60C 23/0408 73/146 |
| 2004/0123654 A1* | 7/2004 | Komatsu | B60C 23/0408 73/146 |
| 2009/0207009 A1 | 8/2009 | Kiesewetter et al. | |
| 2015/0298513 A1* | 10/2015 | Taki | G01M 17/02 73/146.2 |

FOREIGN PATENT DOCUMENTS

| | | |
|---|---|---|
| JP | 7-149123 A | 6/1995 |
| JP | 2005-125971 A | 5/2005 |
| JP | 2005-212669 A | 8/2005 |
| JP | 2006-232130 A | 9/2006 |
| JP | 2010-143406 A | 7/2010 |
| JP | 2015-116913 A | 6/2015 |
| JP | 2016-205300 A | 12/2016 |

* cited by examiner

*Primary Examiner* — Behrang Badii
(74) *Attorney, Agent, or Firm* — Global IP Counselors, LLP

(57) ABSTRACT

A tire air pressure warning device includes a tire air pressure sensor and at least one controller that warns a driver that a tire air pressure detected by the tire air pressure sensor has dropped to or below a first prescribed pressure. The at least one controller further notifies the driver is reduction in the tire air pressure upon determining that the tire air pressure has dropped to or below a second prescribed pressure, which is above the first prescribed pressure. The at least one controller further determines whether the tire air pressure has dropped to or below the second prescribed pressure based on when the tire air pressure is at or below the second prescribed pressure in an ignition switch on state, and whether the tire air pressure has dropped to or below the second prescribed pressure when the ignition switch is turned off.

5 Claims, 4 Drawing Sheets

TIRE PRESSURE WARNING DEVICE

CROSS-REFERENCE TO RELATED APPLICATIONS

This application is a U.S. national stage application of International Application No. PCT/JP2018/017583, filed on May 7, 2018.

BACKGROUND

Technical Field

The present invention relates to a tire air pressure warning device that monitors tire air pressure and warns the driver of decreased air pressure.

Background Information

Japanese Laid-Open Patent Application No. 2010-143406 (Patent Document 1) discloses a technique for monitoring tire air pressure and warning the driver when the air pressure drops to a prescribed pressure.

SUMMARY

In the technique disclosed in Patent Document 1, the prescribed pressure is set to 90% of a reference tire air pressure, so that a warning is not issued until the air pressure decreases to 90%. However, if travel continues while the tire air pressure decreases to 90% of the reference tire air pressure, for example, to 93%, there is the risk that the fuel economy will deteriorate.

An object of the present invention is to provide a tire air pressure warning device that can avoid a deterioration in fuel economy due to a reduction in tire air pressure.

In order to achieve the object described above, in the present invention, when it is determined that the tire air pressure has dropped to or below a second prescribed pressure, which is higher than a first prescribed pressure at which the driver is warned, the driver is notified of the reduction in tire air pressure.

It is therefore possible to avoid travel in a state in which the rolling resistance of the tires has increased and to avoid a deterioration in fuel economy.

BRIEF DESCRIPTION OF THE DRAWINGS

Referring now to the attached drawings which form a part of this original disclosure.

DETAILED DESCRIPTION OF EMBODIMENTS

Embodiments of the present invention will be explained below with reference to the appended drawings.

First Embodiment

Figure 1:
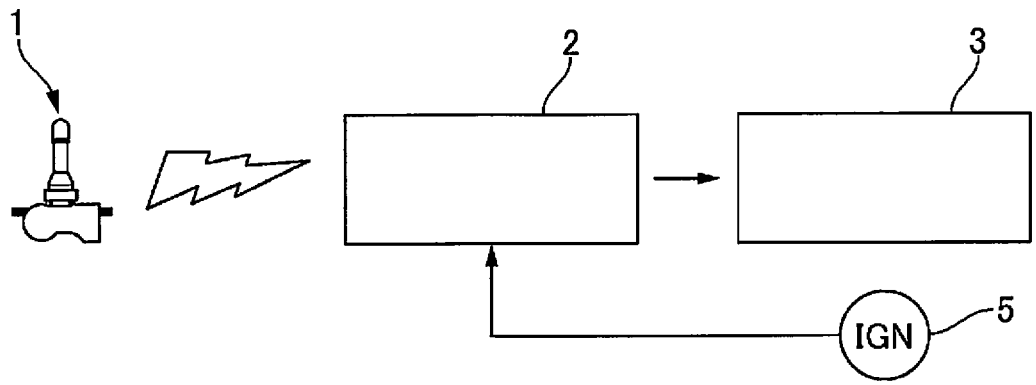
FIG. 1 is a system diagram of a tire air pressure warning device according to a first embodiment.

FIG. 1 is a system diagram of a tire air pressure warning device (Tire Pressure Monitoring System; hereinafter also referred to as TPMS) of the first embodiment. A tire air pressure sensor 1 detects the air pressure inside a tire and transmits air pressure information by means of electromagnetic waves. A tire air pressure controller 2 receives the air pressure information transmitted from the tire air pressure sensor 1 and receives an on/off signal from an ignition switch 5 to execute tire air pressure monitoring control. A meter controller 3 displays information relating to tire air pressure on a meter panel, described further below, based on the information transmitted from the tire air pressure controller 2.

In the tire air pressure monitoring control, when the tire air pressure drops to or below a warning pressure A1, which is the reference placard pressure, a low-pressure warning process is executed to output low-pressure warning information (hereinafter referred to as TPMS warning) to the meter controller 3. When the TPMS warning is received, the meter controller 3 displays the TPMS warning in the meter panel to alert the driver that the tire air pressure is low. The warning pressure A1 is a value in the vicinity of a lower limit at which the vehicle can safely travel, and is set above the legally stipulated legal pressure for the Unites States and Europe. In addition, in the tire air pressure monitoring control, when the tire air pressure has dropped below the placard pressure and to or below an advised fuel economy pressure A0, which is higher than the warning pressure A1, an advised fuel economy process is executed to output advised fuel economy information to the meter controller 3. The meter controller 3 displays the advised fuel economy information in the meter panel and advises the driver how to improve the deterioration in fuel economy caused by the decrease in the tire air pressure.

Figure 2:
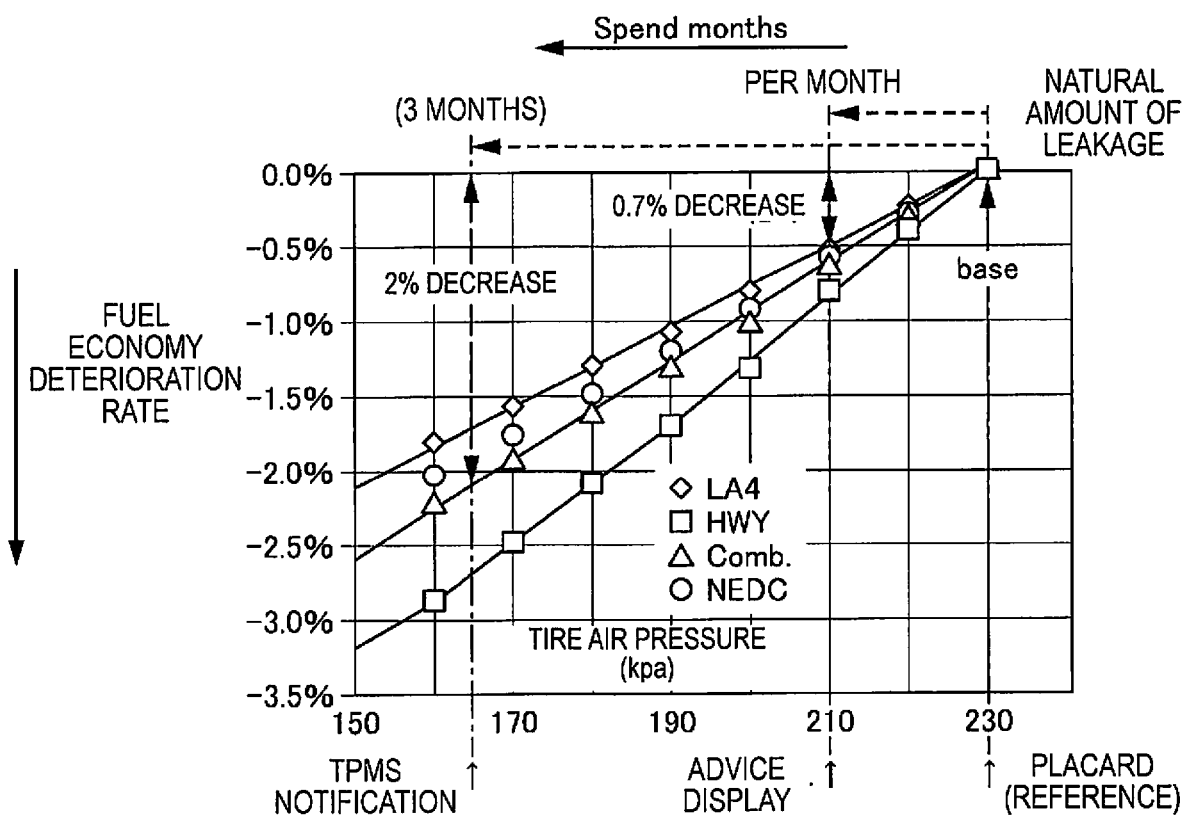
FIG. 2 is a characteristic diagram representing the relationship between a reduction in tire air pressure and the fuel economy deterioration rate in a tire mounted on a vehicle.

FIG. 2 is a characteristic diagram representing the relationship between the decrease in tire air pressure and the fuel economy deterioration rate for a tire mounted on a vehicle. In FIG. 2, the horizontal axis is the tire air pressure (kpa) and the vertical axis indicates the fuel economy deterioration rate (%). That is, if the tire air pressure decreases, the rolling resistance of the tire increases, which leads to a deterioration in fuel economy due to the increased rolling resistance. In FIG. 2, ◊ indicates the case of travel in LA4 mode, ☐ indicates the case of travel in HWY mode, Δ indicates the case of travel in Comb. mode, and ○ indicates the case of travel in NEDC mode. Here, the LA4 mode is one of the driving patterns for measuring exhaust gas in the United States, and is a driving mode that assumes urban driving, the HWY mode is a driving mode that assumes highway driving, and the Comb. mode is a driving mode that combines urban driving and highway driving. In addition, the NEDC mode is one of the driving patterns for measuring exhaust gas in Europe and is a driving mode that combines urban driving and highway driving.

As shown in FIG. 2, when the placard pressure is 230 kpa, the tire air pressure decreases to 210 kpa after about one month due to natural leakage. At this time, the fuel economy deteriorates by about 0.7% in the Comb. mode, which represents the average driving state of each driving mode. After another three months, the tire air pressure decreases to about 165 kpa, which is a deterioration in fuel economy of about 2%. If the warning pressure A1 is set to 165 kpa and no notification is issued until the pressure drops to or below the warning pressure A1, driving would be continued in a state of deteriorated fuel economy for several months, which leads to a deterioration in fuel economy. Therefore, in the first embodiment, an advised fuel economy pressure A0 is set in order to avoid continued driving in a state of deteriorated fuel economy. For example, in the case of FIG. 2, the advised fuel economy pressure is set to 210 kpa, and the driver follows the advice to adjust the tire air pressure to or above the advised fuel economy pressure, so as to reduce the fuel economy deterioration rate.

Figure 3:
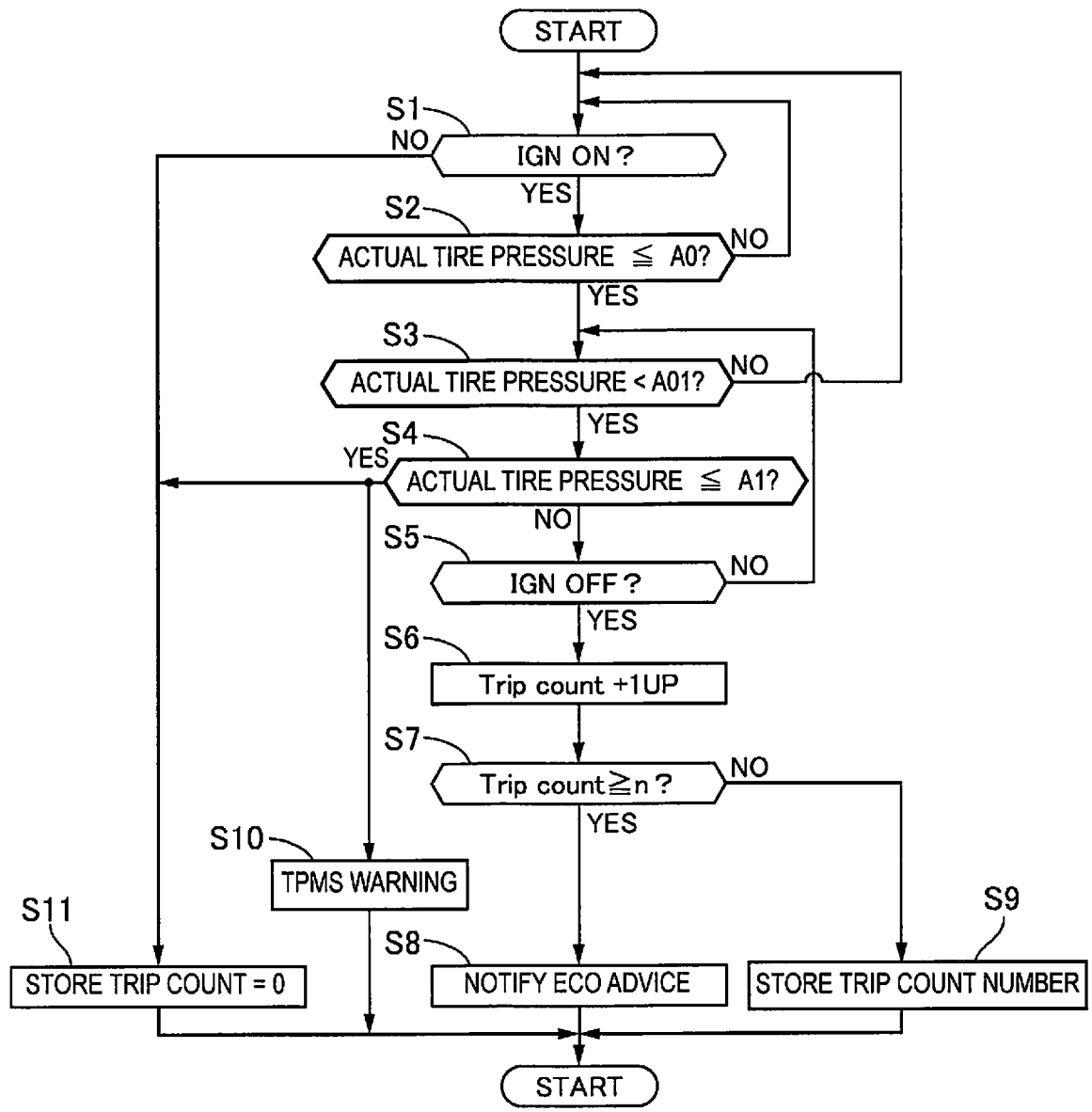
FIG. 3 is a flow chart showing tire air pressure monitoring control of the first embodiment.

FIG. 3 is a flow chart showing the tire air pressure monitoring control of the first embodiment. In Step S1, it is determined whether the ignition switch 5 is on; if off, the process proceeds to Step S11 and stores a trip counter Trip count described further below as 0, and if on, the process proceeds to Step S2.

In Step S2, it is determined whether the actual tire pressure is at or below the advised fuel economy pressure A0; if the actual tire pressure is at or below A0, the process proceeds to Step S3; otherwise, the process returns to Step S1 and repeats Step S1.

In Step S3, it is determined whether the actual tire pressure is below an advised fuel economy cancellation pressure A01; if below A01, the process proceeds to Step S4, and if at or above A01, the process returns to Step S1 and repeats Step S1. Here, the advised fuel economy cancellation pressure A01 is a value above the advised fuel economy pressure A0 and below the placard pressure, and is used to prevent determination hunting at the advised fuel economy pressure A0. For example, in a case in which a vehicle has been stopped for a long period of time in a cold area and the tire has cooled so that the tire air pressure has fallen below the advised fuel economy pressure A0, there are cases in which the tire air pressure rises to A0 or above when warmed up during travel. If hunting occurs in the vicinity of A0 in this manner, the advised fuel economy information cannot be output. Thus, the advised fuel economy cancellation pressure A01 is set.

Figure 4:
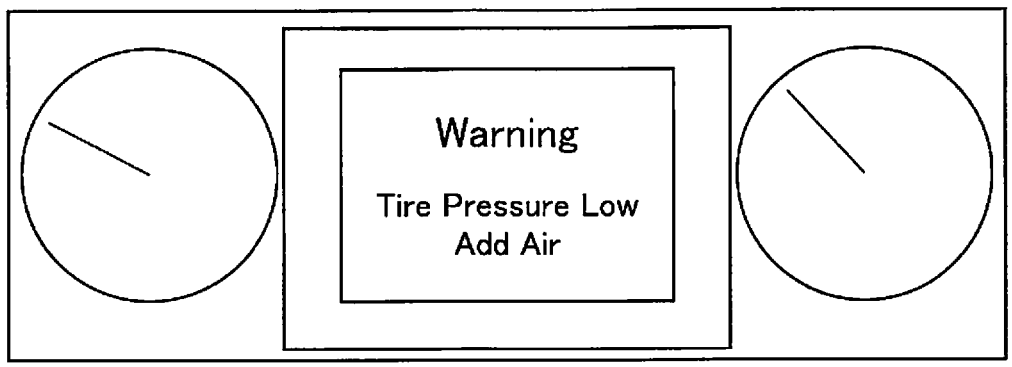
FIG. 4 is a schematic diagram representing TPMS warning of the first embodiment.

In Step S4, it is determined whether the actual tire pressure is at or below the warning pressure A1; if the actual tire pressure is at or below A1, the process proceeds to Steps S10 and S11, a TPMS warning is output and the Trip count is stored as 0. FIG. 4 is a schematic diagram representing the TPMS warning of the first embodiment. When the TPMS warning is output, the TPMS warning is displayed in the meter panel. Since this is displayed before other displays, it is possible to prompt the driver to quickly increase the tire air pressure.

In Step S5, it is determined whether the ignition switch 5 is off; if off, the process proceeds to Step S6; otherwise, the process returns to Step S3 for continuous monitoring of the tire air pressure and to determine whether the pressure has risen to or above the advised fuel economy cancellation pressure A01. Here, the reason that it is determined whether the ignition switch 5 is off will be described. As stated above, the ignition switch 5 is turned on before the start of driving, and it is assumed that the tire air pressure will rise during travel. On the other hand, when the ignition switch 5 is turned off, the tire air pressure is stable after a warm-up period during travel.

In Step S6, the Trip count is incremented by +1.

In Step S7, it is determined whether the Trip count is a prescribed number of times n or more; if the count is greater than or equal to n, the process proceeds to Step S8 and the advised fuel economy process is executed to display the advised fuel economy information (ECO ADVICE) in the meter panel. On the other hand, if less than n, the process proceeds to Step S9, and the Trip count number is stored.

Figure 5:
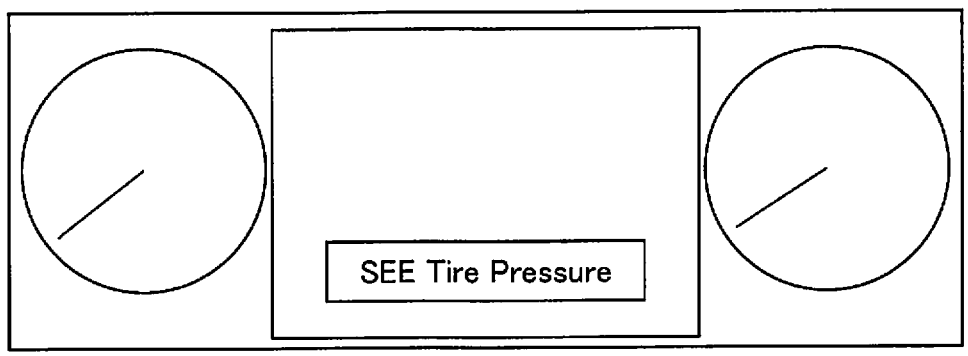
FIG. 5 is a diagram showing a display state of advised fuel economy information of the first embodiment.
Figure 6:
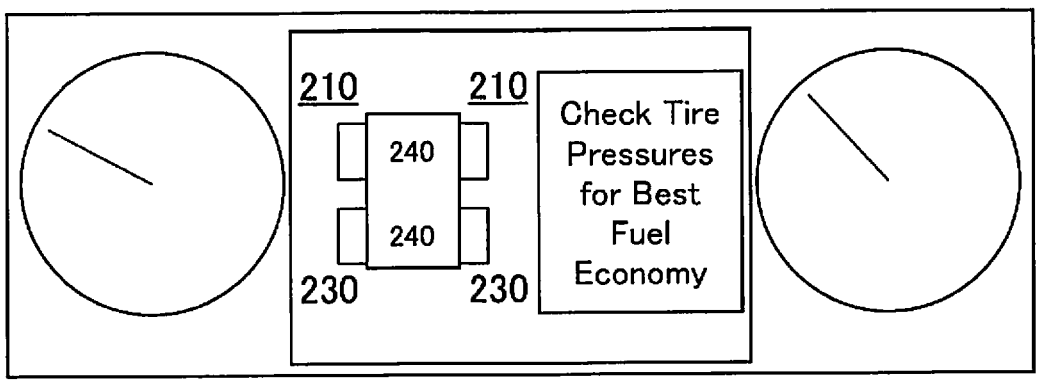
FIG. 6 is a diagram showing a display state of the advised fuel economy information of the first embodiment.

FIGS. 5 and 6 are diagrams showing a display state of the advised fuel economy information of the first embodiment. The notification of the advised fuel economy information (ECO ADVICE) is less urgent than the TPMS warning. Therefore, if the display is prioritized over other displays, there is the risk of making the driver uncomfortable. Thus, as shown in FIG. 5, when the ignition switch 5 is off, a display prompting the driver to see the tire air pressure information is displayed. Before the driver actually sees the tire air pressure information, the advised fuel economy information (ECO ADVICE) shown in FIG. 6 is displayed on the tire air pressure information screen. When the driver operates a button or the like, and switches to the tire air pressure information screen, advised fuel economy information (ECO ADVICE) prompting adjustment of the tire air pressure for achieving optimum fuel economy is displayed, as shown in FIG. 6. Since the ignition switch 5 is off at this point, the screen in the meter panel turns off after a prescribed period of time has elapsed.

Figure 7:
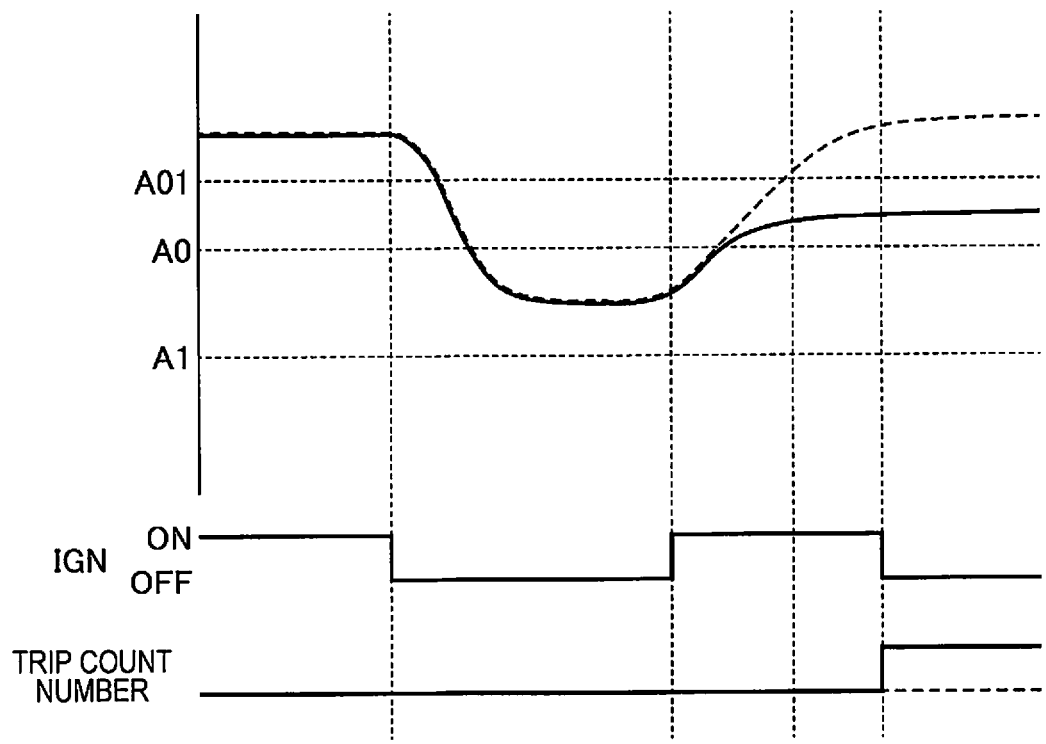
FIG. 7 is a timing chart showing the tire air pressure monitoring control of the first embodiment.

FIG. 7 is a timing chart showing the tire air pressure monitoring control of the first embodiment. In the initial state of the timing chart, the ignition switch 5 is off, the Trip count number is 0, and the outside temperature is low.

At time t1, the ignition switch 5 is turned off. The vehicle is in a stopped state, and the outside temperature is low, so that the actual tire pressure starts to gradually decrease and drops to or below the advised fuel economy pressure A0, but the Trip count number is not incremented at this stage. Thus, even if the tire air pressure changes due to the outside temperature, it is possible to avoid unnecessary advice.

At time t2, when the ignition switch 5 is turned on again, the actual tire pressure is at or below the advised fuel economy pressure A0, below the advised fuel economy cancellation pressure A01, and above the warning pressure A1, so that a process repeating Steps S3-S5 is executed.

At time t3, the actual tire pressure gradually increases, and, as indicated by the dotted line in FIG. 7, when the pressure becomes higher than the advised fuel economy cancellation pressure A01, the process returns from Step S3 to Step S1, so that when the ignition switch 5 is turned off at time t4, the process proceeds to Step S11, and the Trip count number is stored as 0. On the other hand, as indicated by the solid line in FIG. 7, if the state in which the actual tire pressure is less than the advised fuel economy cancellation pressure A01 continues, Steps S3-S5 are repeated, so that when the ignition switch 5 is turned off at time t4, the process proceeds to Step S6, and the Trip count number is incremented. In this manner, when the ignition switch 5 is on, if the actual tire pressure is at or below the advised fuel economy pressure A0 even once and has not risen to the advised fuel economy cancellation pressure A01, the advised fuel economy process is executed, so that appropriate advice can be given while determination hunting is suppressed. In addition, by counting the Trip count number at the timing at which the ignition switch 5 is turned off, it is possible to make a determination while the actual tire air pressure is stable, so that it is possible to avoid unnecessary advice.

Figure 8:
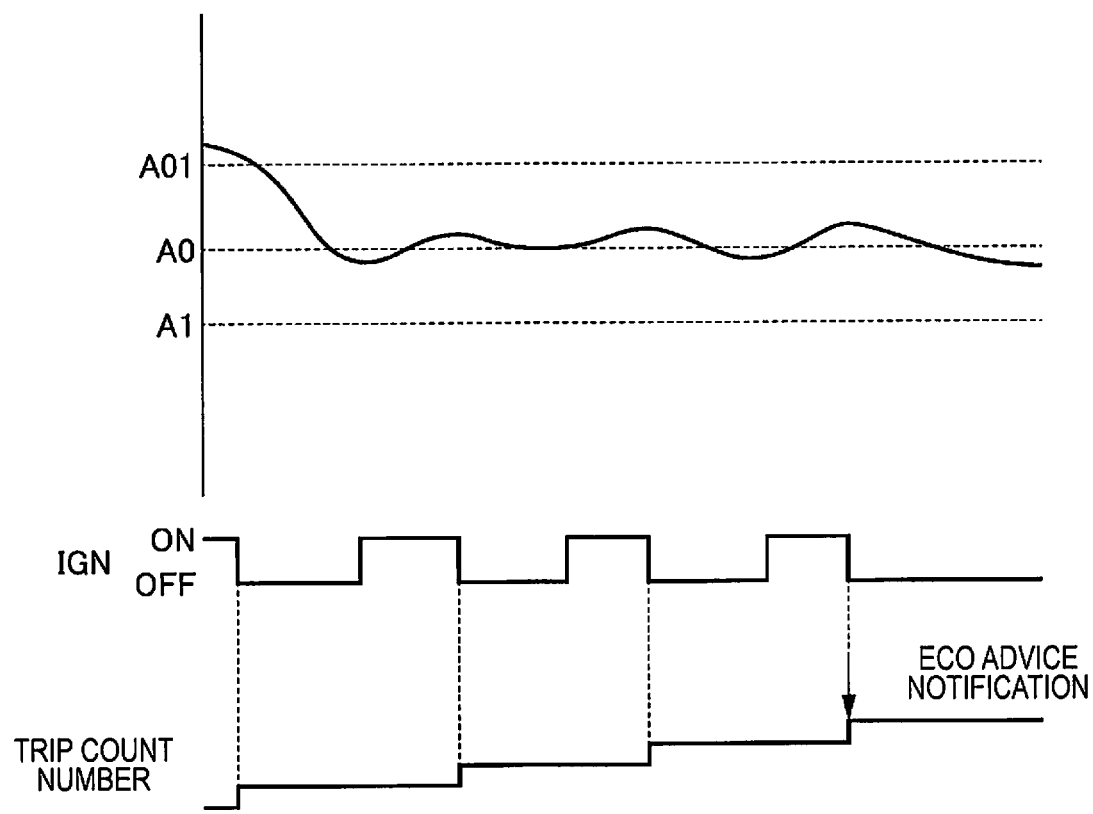
FIG. 8 is a timing chart showing the timing up to the point a Trip count number reaches n (for example, 4) in the tire air pressure monitoring control of the first embodiment.

FIG. 8 is a timing chart showing the timing up to the point the Trip count number reaches n (for example, 4) in the tire air pressure monitoring control of the first embodiment. As described in FIG. 7, even if the actual tire air pressure falls below the advised fuel economy pressure A0 even once and is rising and falling in the vicinity of the advised fuel economy pressure A0, the Trip count number is incremented each time the ignition switch 5 is turned off. Then, when the Trip count number reaches n, the notification of the advised fuel economy information (ECO ADVICE) is executed. In this manner, by reporting the advised fuel economy information (ECO ADVICE) based on the results of a plurality of determinations, it is possible to achieve a notification that is based on a stable determination result.

As described above, the first embodiment realizes the following effects.

(1) The driver is warned that the tire air pressure has dropped to or below the warning pressure A1 (first prescribed pressure), and, when it is determined that the tire air pressure has dropped to or below the advised fuel economy pressure A0 (second prescribed pressure), which is higher than a warning pressure A1, the driver is notified of the reduction in the tire air pressure. It is therefore possible to avoid travel in a state of increased rolling resistance of the tires, and to avoid deteriorated fuel economy.

(2) It is determined whether the pressure has dropped to or below the advised fuel economy pressure A0 when the ignition switch 5 is turned off. Thus, it is possible to make a determination in a state in which the actual tire air pressure is stable and to avoid unnecessary fuel economy advice.

(3) A number of times that the tire air pressure drops to or below the advised fuel economy pressure A0 is counted, and when the count exceeds a prescribed number of times n, it is determined that the pressure has dropped to or below the advised fuel economy pressure A0. Thus, it is possible to notify the driver of the advised fuel economy information (ECO ADVICE) based on a stable determination result.

The invention claimed is:

1. A tire air pressure warning device comprising:
a tire air pressure sensor; and
at least one controller configured to issue a warning to warn a driver that a tire air pressure detected by the tire air pressure sensor has dropped to or below a first prescribed pressure,
the at least one controller being further configured to determine whether the tire air pressure has dropped to or below a second prescribed pressure, which is above the first prescribed pressure, while in an ignition switch on state, and
the at least one controller being further configured to notify the driver of a reduction in the tire air pressure upon determining that the tire air pressure sensor is at or below the second prescribed pressure while the ignition switch is turned off after also determining the tire air pressure was at or below the second prescribed pressure while in the ignition switch on state.

2. The tire air pressure warning device according to claim 1, wherein
the at least one controller includes a tire air pressure controller and a meter controller.

3. The tire air pressure warning device according to claim 1, wherein
the at least one controller is further configured to count a number of times that the tire air pressure was at or below the second prescribed pressure, and the at least one controller is further configured to determine that the pressure has dropped to or below the second prescribed pressure when the number counted exceeds a prescribed number of times.

4. The tire air pressure warning device according to claim 3, wherein
the at least one controller is further configured to issue the warning so as to indicate to the driver that the tire air pressure is low in response to the tire air pressure being detected to have dropped to or below the first prescribed pressure, and
the at least one controller is further configured to prompt the driver to look at tire air pressure information as a notification of the tire air pressure being detected to have dropped to or below the second prescribed pressure while the ignition switch is turned off after also determining the tire air pressure was at or below the second prescribed pressure while in the ignition switch on state.

5. The tire air pressure warning device according to claim 1, wherein
the at least one controller is further configured to issue the warning so as to indicate to the driver that the tire air pressure is low in response to the tire air pressure being detected to have dropped to or below the first prescribed pressure, and
the at least one controller is further configured to prompt the driver to look at tire air pressure information as a notification of the tire air pressure being detected to have dropped to or below the second prescribed pressure while the ignition switch is turned off after also determining the tire air pressure was at or below the second prescribed pressure while in the ignition switch on state.

* * * * *